Sept. 20, 1949.  R. C. WAPPNER  2,482,228
THERMOMETER
Filed Dec. 7, 1945
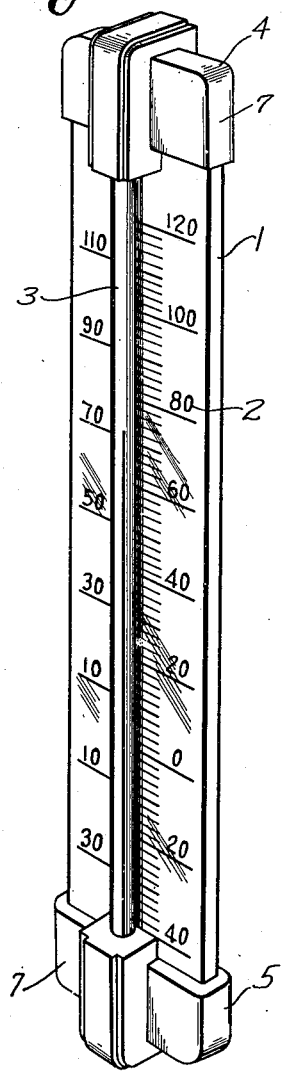
Fig.-1
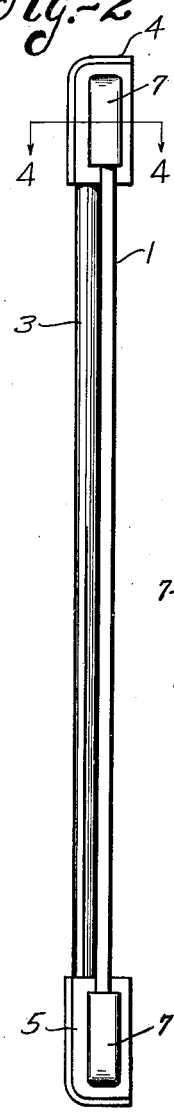
Fig.-2
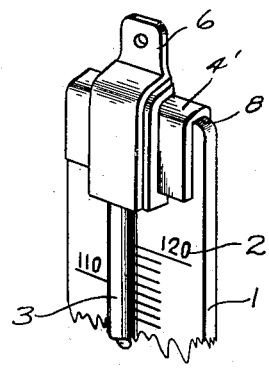
Fig.-3   Fig.-5
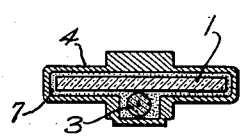
Fig.-4
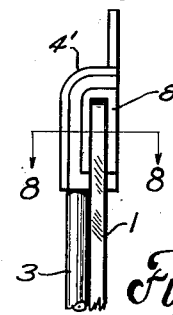
Fig.-6
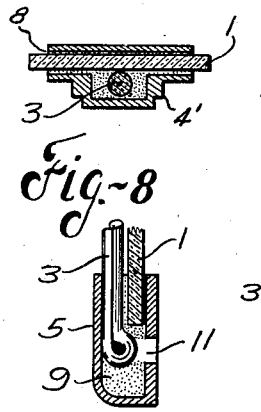
Fig.-8   Fig.-7
Fig.-9
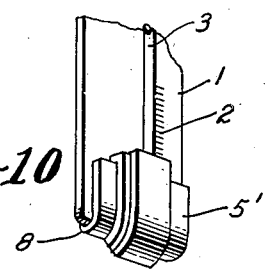
Fig.-10
Inventor
Ralph C. Wappner
F. L. Walker
By
Attorney Patented Sept. 20, 1949

2,482,228

UNITED STATES PATENT OFFICE 2,482,228

THERMOMETER

Ralph C. Wappner, Springfield, Ohio, assignor to The Ohio Thermometer Company, Springfield, Ohio, a corporation of Ohio Application December 7, 1945, Serial No. 633,332

2 Claims. (Cl. 73—376)

This invention pertains to measuring instruments, and more particularly to room or wall thermometers, and especially to improved means for attaching the conventional thermometer indicating tube to a supporting back and scale.

In the presently illustrated embodiment of the invention there is contemplated a composite thermometer back and scale of glass or other fragile material, having duofunctional terminals which not only support the assembled thermometer as an entity, but further serve to attach the indicating tube in calibrated relation with the graduated scale without other fastening means. It is to be understood, however, that the invention is not limited to use of a fragile combined back and scale, but may be embodied in an instrument having separate back and scale of other material, including metal scale and a wooden or metal back, or a single metallic graduated element comprising both back and scale.

The object of the invention is to improve the construction as well as the means and mode of assembly of thermometers, whereby they may not only be economically manufactured and assembled, but will be efficient in use, of attractive ornamental appearance, having relatively few parts, easily assembled, and be unlikely to get out of repair or proper adjustment of the indicating tube in relation to its scale.

A further object of the invention is to provide for substantially equalized expansion and contraction of the indicating tube and its support and scale, whereby the calibration of the instrument will be more accurately maintained.

A further object of the invention is to provide improved means for attaching the indicating tube and its scale.

A none the less important purpose of the invention is to provide a thermometer of distinctive ornamental appearance wherein the indicating tube is attached to a scale of fragile material, such as glass, ceramic or analogous material to which it would be difficult to attach the indicating tube by conventional means, to wit, metal clips or clevises riveted to the scale in straddle relation with the tube.

A further object of the invention is to provide a thermometer structure embodying the advantageous structural features and inherent meritorious characteristics and mode of assembly herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, Fig. 1 is a perspective view of an assembled thermometer embodying the present invention.

Fig. 2 is a side view thereof.

Fig. 3 is a vertical sectional view of the upper end of the structure shown in Fig. 1.

Fig. 4 is a transverse sectional view on line 4—4 of Fig. 2.

Fig. 5 is a fragmentary perspective view illustrating a modification.

Fig. 6 is a side elevation of the assembly shown in Fig. 5.

Fig. 7 is a detail vertical sectional view thereof.

Fig. 8 is a transverse sectional view on line 8—8 of Fig. 6.

Fig. 9 is a vertical sectional view of the lower end of either form of assembly.

Fig. 10 is a fragmentary perspective view of the base member corresponding to the modified construction shown in Fig. 5.

Like parts are indicated by similar characters of reference throughout the several views.

Referring to the accompanying drawing, 1 is a composite thermometer scale and back of glass or other analogous material, having imprinted or marked thereon a graduated scale 2 of degrees of temperature corresponding to the calibration of a thermometer indicating tube 3. The glass back or scale 1 cannot be economically drilled without excess breakage, for reception of the conventional metal clips or clevices which usually bridge or straddle the indicating tube 3 with their ends riveted to the customary metal scale or back. In the present instance the opposite ends of the glass or analogous composite back and scale are enclosed in ornamental terminals 4 and 5 which may be of identical shape and appearance, or may be of different size and style. The upper terminal 4 may be provided with a finger, tab or tongue 6 to function as a hanger, or the lower terminal 5 may be formed with a base or support upon which the assembled thermometer may stand upright. The terminals 4 and 5 are formed with a socket or mortise 7 therein within which the ends of the glass back and scale 1 are completely enclosed, as in Figs. 1 and 2. The opposite ends of the indicating tube 3 are seated within the recesses or sockets of the respective terminals 4 and 5. The recess 9 in the lower terminal 5 is of larger size than that of the opposite member 4 to accommodate the bulb of the tube 3.

Alternatively such members 4 and 5 may comprise saddles 4' and 5' having therein slots to receive the ends of the composite back and scale as in Figs. 5 to 8 and 10. The slots are formed by rearwardly offset tongues 8 for hook engagement with an edge of the back or scale 1. Otherwise, the saddles 4' and 5' are the same as the terminal members 4 and 5, a cross section through the lower terminal 5 or 5' being shown in Fig. 9.

As is usual, the capacities of capillary passages and bulbs of different tubes 3 varies considerably. Therefore, a series of backs and scales 1 are provided having differently predetermined spaced graduations. The tubes 3 are tested at different known or predetermined temperatures and are marked at indicated points. The tested tubes 3 are then applied to selected scales 1 having like spacing of the particular graduations corresponding to the selected test temperatures. It is quite important that the tubes 3 and the backs and scales be very accurately matched, and that they be maintained in the proper adjusted relation to assure accuracy of temperature reading. When the selected tube is properly positioned in relation with its corresponding scale 1, with its opposite ends positioned within the recesses of the terminals 4 and 5, the surrounding space within the bores is filled with wax or with investment plaster to permanently anchor the tube 3 in its adjusted position. The lower terminal 5 is preferably formed with an opening 11 through which atmosphere may communicate directly with the surface of the indicating tube bulb, as shown in Fig. 9. The ends of the back and scale may be cemented within the terminals 4 and 5, or the clearance space therein may be filled with wax or plaster.

While the construction disclosed herein is desirable and economical for manufacture of thermometers having glass or other fragile backs and scales, it is also useful for mounting indicating tubes in cooperating relation with scales and backs of other non-fragile material, such as metal, wood, or ceramic material.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A thermometer including a composite back and scale having a series of temperature graduations thereon, a pair of relatively spaced socket members for reception of opposite ends of an indicating tube, an integral finger on the back of each socket member extending in spaced relation with the body thereof and affording therebetween an intermediate space in which an edge of the composite back and scale is engageable for interconnecting the socket members with said back and scale, and an indicating tube, the opposite ends of which are seated within the relatively spaced socket members the tube being associated with the composite back and scale thereby.

2. A thermometer comprising an elongated back plate having a series of graduations thereon, a thermometer tube positioned in calibrated relation with the series of graduations, a pair of socket terminals fitted over the opposite ends of the back plate and thermometer tube, and means sealing said ends in the socket terminals to hold the back plate and thermometer tube in spaced relation.

RALPH C. WAPPNER.

REFERENCES CITED

The following references are of record in the file of this patent:

UNITED STATES PATENTS

| Number | Name | Date |
| --- | --- | --- |
| 1,345,795 | Milker | July 6, 1920 |
| 1,605,466 | Roedell | Nov. 2, 1926 |
| 2,139,805 | Chase | Dec. 13, 1938 |
| 2,297,792 | Neuwirth | Oct. 6, 1942 |